US009660558B2

(12) United States Patent
Kim

(10) Patent No.: US 9,660,558 B2
(45) Date of Patent: May 23, 2017

(54) SYSTEM AND METHOD FOR CONTROLLING REGENERATIVE BRAKING OF ELECTRIC VEHICLE

(71) Applicant: Hyundai Motor Company, Seoul (KR)

(72) Inventor: Sangjoon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 36 days.

(21) Appl. No.: 14/559,638

(22) Filed: Dec. 3, 2014

(65) Prior Publication Data

US 2016/0105132 A1    Apr. 14, 2016

(51) Int. Cl.
| | | |
|---|---|---|
| *B60T 8/17* | (2006.01) | |
| *H02P 3/14* | (2006.01) | |
| *B60L 11/18* | (2006.01) | |
| *B60L 7/10* | (2006.01) | |
| *B60L 7/22* | (2006.01) | |

(52) U.S. Cl.
CPC ............ *H02P 3/14* (2013.01); *B60L 11/1803* (2013.01); *B60L 11/1861* (2013.01); *B60L 7/10* (2013.01); *B60L 7/22* (2013.01)

(58) Field of Classification Search
USPC ........... 701/22, 51; 180/65.1, 65.265, 65.21; 477/3–4; 303/152
See application file for complete search history.

(56) References Cited

U.S. PATENT DOCUMENTS

| | | | | |
|---|---|---|---|---|
| 6,909,200 B2 * | 6/2005 | Bouchon | ................... | B60K 6/28 180/65.245 |
| 7,148,649 B2 * | 12/2006 | Ganev | ....................... | H02P 9/48 318/701 |
| 7,597,408 B2 * | 10/2009 | Kim | .......................... | B60L 7/10 303/122.03 |
| 7,673,948 B2 * | 3/2010 | Otomo | ...................... | B60T 8/26 188/358 |

(Continued)

FOREIGN PATENT DOCUMENTS

| | | |
|---|---|---|
| JP | 2003-125502 A | 4/2003 |
| JP | 4672061 B2 | 4/2011 |

(Continued)

OTHER PUBLICATIONS

Research of the regenerative braking and energy recovery system for electric vehicle; Zhang Guirong; World Automation Congress (WAC), 2012; Year: 2012 ; pp. 1-4.*

(Continued)

*Primary Examiner* — Cuong H Nguyen
(74) *Attorney, Agent, or Firm* — Mintz Levin Cohn Ferris Glovsky and Popeo, P.C.; Peter F. Corless

(57) ABSTRACT

A system and a method for controlling regenerative braking of an electric vehicle are provided. The system and method calculate an available torque considering a battery system and an available torque considering a motor system to improve an accuracy of regenerative braking amount. The method includes calculating an available torque considering a battery system and an available torque considering a motor (Continued)

system when regenerative braking of the electric vehicle is required and calculating a regenerative braking capacity based on the available torque considering the battery system and the available torque considering the motor system.

16 Claims, 2 Drawing Sheets

(56) References Cited

U.S. PATENT DOCUMENTS

| | | | | |
|---|---|---|---|---|
| 7,841,433 | B2* | 11/2010 | Soliman | B60K 6/442 180/65.21 |
| 7,908,067 | B2* | 3/2011 | Soliman | B60K 6/365 180/65.1 |
| 8,285,431 | B2* | 10/2012 | Heap | B60K 6/365 180/65.21 |
| 8,577,532 | B2* | 11/2013 | Muta | B60K 6/445 180/338 |
| 8,596,390 | B2* | 12/2013 | Soliman | B60K 6/365 180/65.21 |
| 8,880,258 | B2* | 11/2014 | Breton | B60W 20/10 701/101 |
| 9,061,680 | B2* | 6/2015 | Dalum | B60W 20/10 |
| 9,126,501 | B2* | 9/2015 | Ozaki | B60L 7/18 |
| 9,174,525 | B2* | 11/2015 | Caron | B60L 11/005 |
| 2008/0116744 | A1* | 5/2008 | Kim | B60L 7/10 303/152 |
| 2008/0243322 | A1* | 10/2008 | Nobumoto | B60W 10/02 701/22 |
| 2009/0118920 | A1* | 5/2009 | Heap | B60K 6/365 701/54 |
| 2009/0145673 | A1* | 6/2009 | Soliman | B60K 6/442 180/65.1 |
| 2011/0088658 | A1* | 4/2011 | Chan | B60K 6/485 123/339.16 |
| 2012/0303194 | A1* | 11/2012 | Muta | B60K 6/445 701/22 |
| 2013/0096759 | A1* | 4/2013 | Breton | B60W 20/10 701/22 |
| 2014/0244082 | A1* | 8/2014 | Caron | B60L 11/005 701/22 |
| 2014/0303824 | A1* | 10/2014 | Ozaki | B60L 7/18 701/22 |
| 2014/0330466 | A1* | 11/2014 | Bureau | B60K 6/48 701/22 |

FOREIGN PATENT DOCUMENTS

| | | |
|---|---|---|
| JP | 2013-132913 A | 7/2013 |
| JP | 2014-082849 A | 5/2014 |
| KR | 10-2005-0070753 A | 7/2005 |
| KR | 10-2005-0119989 A | 12/2005 |
| KR | 10-1048142 B1 | 7/2011 |

OTHER PUBLICATIONS

Energy efficiency analysis and comparison of transmission technologies for an electric vehicle; Hofman, T.; Dai, C.H.; Vehicle Power and Propulsion Conference (VPPC), 2010 IEEE; Year: 2010; pp. 1-6, DOI: 10.1109/VPPC.2010.5729082.*

The Application of Fuzzy Logic in Regenerative Braking of EV; Zijian Zhang; Guoqing Xu; Weimin Li; Liang Zheng; Intelligent Human-Machine Systems and Cybernetics (IHMSC), 2010 2nd International Conference on; Year: 2010, vol. 2 pp. 124-128, DOI: 10.1109/IHMSC.2010.130.*

An effcient induction motor drive method with a regenerative power storage system driven by an optimal torque; Inoue, K.; Ogata, K.; Kato, T. ; Power Electronics Specialists Conference, 2008. PESC 2008. IEEE; Year: 2008; pp. 359-364, DOI: 10.1109/PESC.2008.4591955.*

An approach to enhance the efficiency and consumer acceptability of a Series Plug-in Hybrid vehicle; Rowe, C.; Demirkiran, I.; Bonderczuk, D.; Currier, P.; SoutheastCon 2015; Year: 2015; pp. 1-7, DOI: 10.1109/SECON.2015.7132947.*

Intelligent controller design for electric vehicle; Poorani, S.; Kumar, K.U.; Renganarayanan, S.; Vehicular Technology Conference, 2003. VTC 2003-Spring. The 57th IEEE Semiannual; Year: 2003, vol. 4; pp. 2447-2450 vol. 4, DOI: 10.1109/VETECS.2003.1208830.*

Characterization of advanced drive system for hybrid electric vehicles; Wei Xu; Jianguo Zhu; Yongchang Zhang; Yi Wang; Guangyong Sun; Electrical Machines and Systems (ICEMS), 2010 International Conference on; Year: 2010 pp. 487-492.*

Regenerative Braking System of Electric Vehicle Driven by Brushless DC Motor ; Xiaohong Nian; Fei Peng; Hang Zhang; Industrial Electronics, IEEE Transactions on; Year: 2014, vol. 61, Issue: 10; pp. 5798-5808, DOI: 10.1109/TIE.2014.2300059.*

New Integrated Multilevel Converter for Switched Reluctance Motor Drives in Plug-in Hybrid Electric Vehicles With Flexible Energy Conversion:Chun Gan et al.; IEEE Transactions on Power Electronics; Year: 2016, vol. PP, Issue: 99; pp. 1-1, DOI: 10.1109/TPEL.2016.2583467.*

Anti-lock regenerative braking torque control strategy for electric vehicle; S. M. Reza Tousi et al.; 2016 IEEE International Conference on Industrial Technology (ICIT); Year: 2016; pp. 1418-1423, DOI: 10.1109/ICIT.2016.7474966.*

The configuration of EV system using battery module balancing method; Do-Yun Kim; Chang-Hyun Shin; Jun-Ha Hwang; Young-Real Kim; Chung-Yuen Won; 2015 18th International Conference on Electrical Machines and Systems (ICEMS); Year: 2015 pp. 2122-2126, DOI: 10.1109/ICEMS.2015.7385391.*

Model development and energy management control for hybrid electric race vehicles; K. Reeves; A. Montazeri; C. J. Taylor; 2016 UKACC 11th International Conference on Control (CONTROL); Year: 2016; pp. 1-6, DOI: 10.1109/CONTROL.2016.7737651.*

* cited by examiner

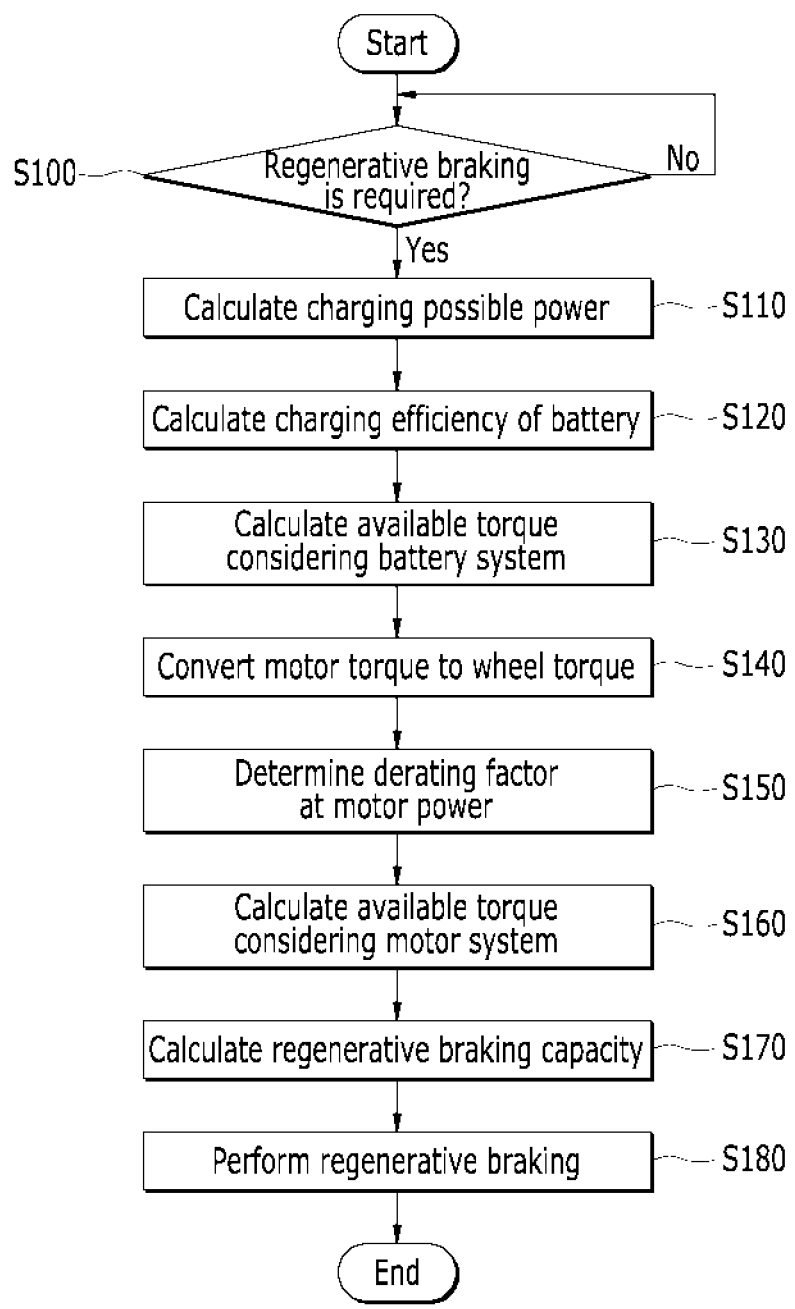

SYSTEM AND METHOD FOR CONTROLLING REGENERATIVE BRAKING OF ELECTRIC VEHICLE

CROSS-REFERENCE TO RELATED APPLICATION

This application claims priority to and the benefit of Korean Patent Application No. 10-2014-0136123 filed in the Korean Intellectual Property Office on Oct. 8, 2014, the entire contents of which are incorporated herein by reference.

BACKGROUND (a) Field of the Invention

The present invention relates to a system and a method for controlling regenerative braking of an electric vehicle. More particularly, the present invention relates to a system and a method for controlling regenerative braking of an electric vehicle by calculating an available torque considering a battery system and an available torque considering a motor system and improving an accuracy of regenerative braking system by calculating a regenerative braking capacity based on a minimum torque between the available torque considering the battery system and the available torque considering the motor system.

(b) Description of the Related Art

Electric vehicles are classified into as a pure electric vehicle in which a motor is driven using electrical energy charged in a battery, a fuel cell vehicle in which the motor is driven using a fuel cell, and a hybrid electric vehicle using combined system of the motor and an engine. The electric vehicles use regenerative braking technology when a braking control based on a brake pedal is performed. In other words, the regenerative braking of the electric vehicle is a technology which applies a counter torque to the motor using energy generated during braking to generate electric energy and stores the generated electric energy in a battery.

For the regenerative braking, a brake controller is configured to calculate a total braking amount when a driver requests a brake, and a vehicle controller is configured to calculate a regenerative braking amount by considering an operating state of the motor. In addition, the brake controller is configured to calculate a total braking amount, and the vehicle controller is configured to calculate a regenerative braking capacity based on the regenerative braking amount. After that, the brake controller is configured to adjust hydraulic pressure supplied to a brake cylinder of a wheel to satisfy the total braking amount.

In other words, the brake controller is configured to divide the total braking amount into the regenerative braking capacity and the hydraulic pressure braking amount, and adjust hydraulic pressure by receiving the regenerative braking amount from the vehicle controller. Therefore, the brake of the electric vehicle may be performed by a cooperative control of the brake controller and the vehicle controller. However, according to a conventional art the brake controller calculates the regenerative braking capacity based on a wheel torque calculated by a maximum motor torque. Accordingly, when a battery system or a motor system is restricted, the brake controller may calculate the regenerative braking capacity correctly. Moreover, an initial brake based on communication delay while receiving the regenerative braking amount from the vehicle controller may cause further issues in controlling the vehicle.

The above information disclosed in this section is merely for enhancement of understanding of the background of the invention and therefore it may contain information that does not form the prior art that is already known in this country to a person of ordinary skill in the art.

SUMMARY

The present invention provides a system and a method for controlling regenerative braking of an electric vehicle having advantages of calculating an available torque considering a battery system and an available torque considering a motor system and improving an accuracy of regenerative braking amount by calculating a regenerative braking capacity based on a minimum torque between the available torque considering the battery system and the available torque considering the motor system.

An exemplary embodiment of the present invention provides a method for controlling regenerative braking of an electric vehicle that may include calculating an available torque considering a battery system and an available torque considering a motor system when regenerative braking of the electric vehicle is required; and calculating a regenerative braking capacity based on the available torque considering the battery system and the available torque considering the motor system.

The method may further include performing regenerative braking based on the regenerative braking capacity after calculating the regenerative braking capacity. The available torque considering the battery system may be calculated based on a charging possible power of the battery and charging efficiency of the battery. The charging possible power of the battery may be calculated based on a battery state of charge (SOC), a charging limit power of the battery limited by a battery temperature, and a loss power of a part load, and the charging efficiency of the battery may be calculated based on a maximum charging torque of the motor according to a motor speed.

The available torque considering the motor system may be calculated based on a wheel torque and a derating factor predetermined at a motor power. The wheel torque may be converted from a motor torque that reflects a gear ratio of a transmission, and the derating factor may be determined at the motor power based on a condition of the motor system. The regenerative braking capacity may be calculated based on a minimum torque between the available torque considering the battery system and the available torque considering the motor system.

Another exemplary embodiment of the present invention provides a system for controlling regenerative braking of an electric vehicle that may include a motor configured to operate as a power source; a transmission connected to the motor; a battery configured to provide a driving voltage to the motor; a battery management system configured to manage a battery state of charge (SOC); a driving information detector configured to detect driving information of the electric vehicle; a brake controller configured to detect a total braking amount based on a signal output from the driving information detector and adjust hydraulic pressure supplied to a brake cylinder of a wheel based on a braking amount of hydraulic pressure; and a vehicle controller configured to determine whether regenerative braking of the electric vehicle is required based on the signal output from the driving information detector, calculate an available torque considering the battery system based on a signal output from the battery management system and an available torque considering the motor system based on a condition of the motor, and perform regenerative braking by calculating a regenerative braking capacity based on a minimum torque between the available torque considering the battery system and the available torque considering the motor system.

The driving information detector may include a vehicle speed sensor configured to detect a vehicle speed; and a brake pedal position sensor configured to detect a position value of a brake pedal (e.g., an engagement degree of the pedal). The vehicle controller may be configured to calculate the available torque considering the battery system based on a charging possible power of the battery and charging efficiency of the battery. The vehicle controller may further be configured to calculate the charging possible power of the battery based on a charging limit power of the battery and a loss power of a part load.

In addition, the vehicle controller may be configured to calculate the charging efficiency of the battery based on a maximum charging torque of the motor according to a motor speed. The vehicle controller may be configured to calculate the available torque considering the motor system based on a wheel torque and a derating factor predetermined at a motor power. The vehicle controller may further be configured to convert a motor torque to the wheel torque by reflecting a gear ratio of a transmission. The vehicle controller may be configured to determine the derating factor at the motor power based on a condition of the motor system.

As described above, according to an exemplary embodiment of the present invention, the regenerative braking amount may be calculated more precisely by calculating the available torque considering the battery system and the available torque considering the motor system simultaneously. Thus, the braking safety of the electric vehicle may be improved.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 2 is an exemplary flowchart showing a method for controlling regenerative braking of an electric vehicle according to an exemplary embodiment of the present invention.

DETAILED DESCRIPTION

Figure 1:
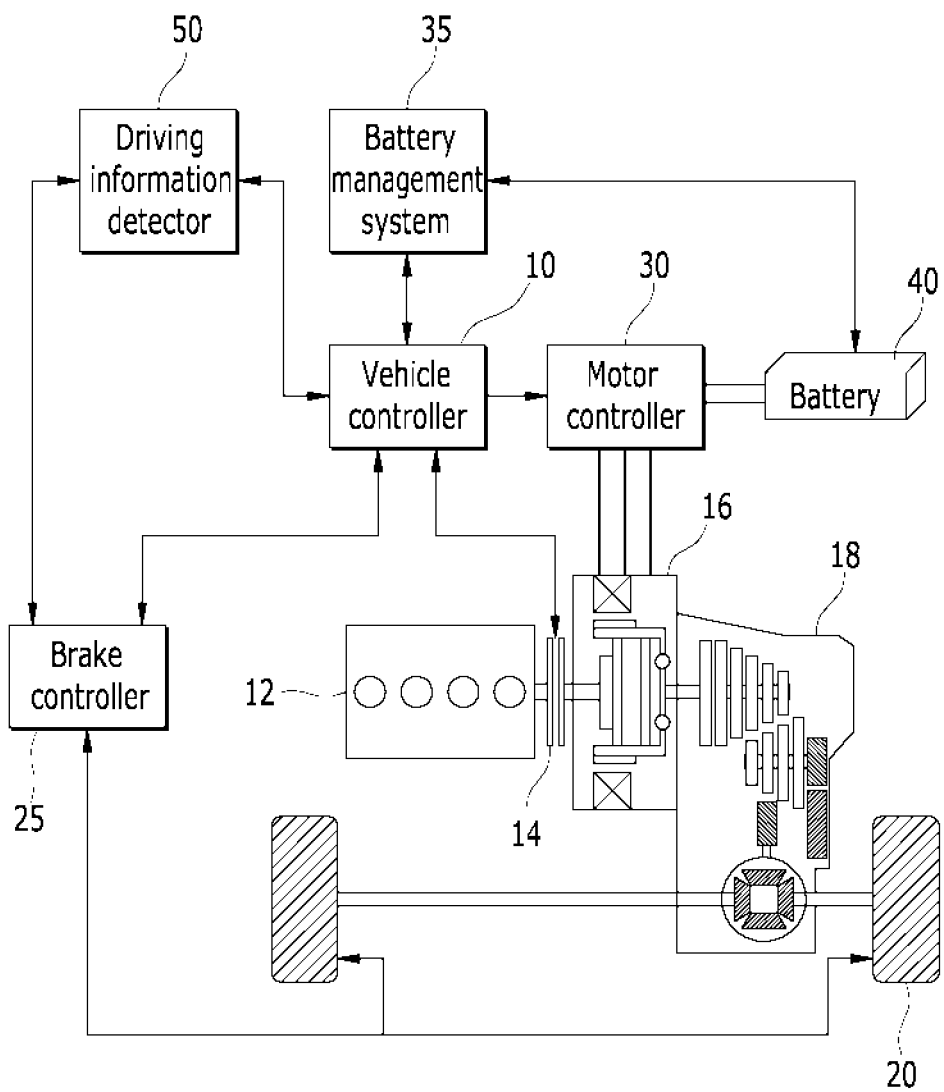
FIG. 1 is an exemplary schematic block diagram of a system for controlling regenerative braking of an electric vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, exemplary embodiments of the present invention have been shown and described, simply by way of illustration. As those skilled in the art would realize, the described exemplary embodiments may be modified in various different ways, all without departing from the spirit or scope of the present invention. Like reference numerals designate like elements throughout the specification.

Furthermore, the control logic of the present invention may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present invention will hereinafter be described in detail with reference to the accompanying drawings. FIG. 1 is an exemplary schematic block diagram of a system for controlling regenerative braking of an electric vehicle according to an exemplary embodiment of the present invention. As shown in FIG. 1, a system for controlling regenerative braking of an electric vehicle according to an exemplary embodiment of the present invention may include a motor 16, a transmission 18, a wheel 20, a brake controller 25, a motor controller 30, a battery management system 35, a battery 40, a driving information detector 50, and a vehicle controller 10.

The electric vehicle according to an exemplary embodiment of the present invention may further include an engine 12 and an engine clutch 14 in some cases. In particular, the electric vehicle may provide a driving mode in which the engine 12 and the motor 16 separately or simultaneously operate as a power source. For this purpose, the engine clutch 14 may be disposed between the engine 12 and the motor 16 to selectively connect the engine 12 and the motor 16 and transmit power to the wheel 20.

The motor 16 may be operated by a 3-phase alternating current (AC) voltage based on a control signal applied from the motor controller 30 and generate a torque. The motor 16 may be operated as a generator in coast down driving to supply a voltage to the battery 40. The motor controller 30 may be configured to operate driving and adjust torque of the motor 16 according to the vehicle controller 10 and store electricity generated in the motor 16 at the battery 40 upon regenerative braking. For these purposes, the motor controller 30 may be provided with one or more microprocessors, and the one or more microprocessor may be executed by a predetermined program for performing a method of controlling driving and torque of the motor 16.

The transmission 18 may be configured to supply a sum of an output torque of the engine 12 and an output torque of the motor 16 determined by coupling and releasing of the engine clutch 14 as an input torque and select a shift gear based on a vehicle speed and a driving condition to output driving force to a driving wheel and maintain driving. The transmission 18 may be a fixed end decelerator or an automatic transmission of many shift speeds, but it is not limited thereto. When the transmission 18 is the automatic transmission of many shift speeds, a gear ratio may be adjusted by a control signal from the vehicle controller 10.

The battery 40 may be formed with a plurality of unit cells, and a high voltage for providing a driving voltage to the motor 16 may be stored in the battery 40. The battery 40 may be configured to supply a driving voltage to the motor 16 in an electric vehicle (EV) mode or a hybrid electric vehicle (HEV) mode, and may be charged with a voltage generated in the motor 16 upon regenerative braking. When a commercial power source is plug-in connected, the battery 40 may be charged by a voltage and a current supplied through a charge device. The battery management system 35 may be configured to detect information such as a voltage, a current, and a temperature of the battery 40 to manage and control a charge state, and execute a state of charge (SOC) based on a control signal from the vehicle controller 10. The battery management system 35 may further be configured to prevent the battery 40 from being discharged to a limited voltage or less or being overcharged to a limited voltage or greater.

The brake controller 25 may be configured to calculate a braking amount of hydraulic pressure of a pedal stroke and hydraulic pressure of a master cylinder when a driver requests a brake. Additionally, the brake controller 25 may be configured to adjust hydraulic pressure braking supplied to a brake cylinder of each wheel 20 based on the braking amount of hydraulic pressure. In an exemplary embodiment of the present invention, when the brake controller 25 detects a brake demand of the driver, the vehicle controller 10 may be configured to calculate a regenerative braking amount and execute regenerative braking, and the brake controller 25 may be configured to execute hydraulic pressure braking at about a remaining braking amount calculated by subtracting the regenerative braking amount from the total braking amount. For these purposes, the brake controller 25 may be provided with one or more microprocessors, and the one or more microprocessor may be executed by a predetermined program for performing a method of controlling hydraulic pressure braking.

The driving information detector 50 may be configured to detect a running state of the electric vehicle and the brake demand of the driver, and transmit a corresponding signal to the vehicle controller 10. The driving information detector 50 may include at least one of an engine speed sensor configured to detect an engine speed, a motor speed sensor configured to detect a motor speed, a vehicle speed sensor configured to detect a vehicle speed, an accelerator pedal position sensor configured to detect a position value of an accelerator pedal, and a brake pedal position sensor configured to detect a position value of a brake pedal.

The vehicle controller 10 may be an uppermost controller and may be configured to integrally operated subordinate controllers connected to a network and collect and analyze information of each subordinate controller to control entire operations of the vehicle. The vehicle controller 10 may be configured to determine whether regenerative braking of the electric vehicle is required based on the signal output from the driving information detector 50, and calculate an available torque considering the battery system based on a signal output from the battery management system 35 and an available torque considering the motor system according to a condition of the motor 16.

Furthermore, the vehicle controller 10 may be configured to perform regenerative braking by calculating a regenerative braking capacity based on a minimum torque between the available torque considering the battery system and the available torque considering the motor system. The vehicle controller 10 may also be configured to calculate the available torque considering the battery system based on a charging possible power of the battery and charging efficiency of the battery, and calculate the available torque considering the motor system based on a wheel torque and a derating factor predetermined at a motor power. For these purposes, the vehicle controller 10 may be provided with one or more microprocessors, and the one or more microprocessor may be executed by a predetermined program for performing a method of controlling regenerative braking of the electric vehicle according to an exemplary embodiment of the present invention.

Hereinafter, a method for calculating a regenerative braking amount of an electric vehicle according to an exemplary embodiment of the present invention will be described in detail with reference to FIG. 2. FIG. 2 is an exemplary flowchart showing a method for calculating a regenerative braking amount of an electric vehicle according to an exemplary embodiment of the present invention. As shown in FIG. 2, a method for controlling regenerative braking of an electric vehicle according to an exemplary embodiment of the present invention may begin with determining whether regenerative braking of the electric vehicle is required at step S100.

When the regenerative braking of the electric vehicle is required at the step S100, the vehicle controller 10 may be configured to calculate a charging possible power of the battery at step S110. The charging possible power of the battery may be calculated based on the a battery state of charge (SOC), a charging limit power of the battery limited by a battery temperature, and a loss power of a part load consumed by an air conditioner or a heater. The vehicle controller 10 may be configured to calculate a charging efficiency of the battery at step S120. The charging efficiency of the battery may be calculated based on a maximum charging torque of the motor according to a motor speed.

Additionally, the vehicle controller 10 may be configured to calculate an available torque considering the battery system at step S130 based on the charging possible power of the battery calculated at the step S110 and the charging efficiency of the battery calculated at the step S120. Further, the vehicle controller 10 may be configured to convert a motor torque to a wheel torque based on a curved line of the motor torque at step S140. The curved line of the motor torque may be turned out differently based on a type of the transmission. Therefore, the vehicle controller 10 may be configured to reflect a gear ratio of the transmission while converting the motor torque to the wheel torque.

The vehicle controller 10 be configured to determine a derating factor at a motor power at step S150. The derating factor which protects the motor 16 may be determined as 0 to 1. In other words, the derating factor may be determined as 1 when the motor system is normal, on the contrary, the derating factor may be determined as 0 when the motor system is not available based on a motor temperature. Furthermore, the vehicle controller 10 may be configured to calculate an available torque considering the motor system at step S160 based on the wheel torque converted at the step S140 and the derating factor determined at the step S150. In other words, the vehicle controller 10 may be configured to simultaneously calculate the available torque considering the battery system and the available torque considering the motor system.

When the available torque considering the battery system is calculated at the step S130 and the available torque considering the motor system is calculated at the step S160, the vehicle controller 10 may be configured to calculate a regenerative braking capacity based on the available torque considering the battery system and the available torque considering the motor system at step S170. The regenerative braking capacity may be calculated based on a minimum torque between the available torque considering the battery system and the available torque considering the motor system. Further, the regenerative braking capacity may be calculated at the step S170, the vehicle controller 10 may be configured to perform regenerative braking based on the regenerative braking capacity at step S180.

As described above, according to an exemplary embodiment of the present invention, the regenerative braking amount may be calculated more precisely by calculating the available torque considering the battery system and the available torque considering the motor system simultaneously. Thus, the braking safety of the electric vehicle may be improved.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

DESCRIPTION OF SYMBOLS

10: vehicle controller
12: engine
14: engine clutch
16: motor
18: transmission
20: wheel
25: brake controller
30: motor controller
35: battery management system
40: battery
50: driving information detector

What is claimed is:

1. A method for controlling regenerative braking of an electric vehicle, comprising:
    calculating, by a controller, an available torque considering a battery system and an available torque considering a motor system when regenerative braking of the electric vehicle is required;
    calculating, by the controller, a regenerative braking capacity based on the available torque considering the battery system and the available torque considering the motor system; and
    performing, by the controller, regenerative braking based on the regenerative braking capacity after calculating the regenerative braking capacity,
    wherein the regenerative braking capacity is calculated based on a minimum torque between the available torque considering the battery system and the available torque considering the motor system.

2. A non-transitory computer readable medium, for controlling regenerative braking of an electric vehicle, containing program instructions executed by a controller to:
    calculate an available torque considering a battery system and an available torque considering a motor system when regenerative braking of the electric vehicle is required;
    calculate a regenerative braking capacity based on the available torque considering the battery system and the available torque considering the motor system; and
    perform regenerative braking based on the regenerative braking capacity after calculating the regenerative braking capacity,
    wherein the regenerative braking capacity is calculated based on a minimum torque between the available torque considering the battery system and the available torque considering the motor system.

3. The method of claim 1, wherein the available torque considering the battery system is calculated based on a charging possible power of the battery and charging efficiency of the battery.

4. The method of claim 3, wherein the charging possible power of the battery is calculated based on a battery state of charge (SOC), a charging limit power of the battery limited by a battery temperature, and a loss power of a part load.

5. The method of claim 3, wherein the charging efficiency of the battery is calculated based on a maximum charging torque of the motor according to a motor speed.

6. The method of claim 1, wherein the available torque considering the motor system is calculated based on a wheel torque and a derating factor predetermined at a motor power.

7. The method of claim 6, wherein the wheel torque is converted from a motor torque reflecting a gear ratio of a transmission.

8. The method of claim 6, wherein the derating factor is determined at the motor power based on a condition of the motor system.

9. A system for controlling regenerative braking of an electric vehicle, comprising:
    a motor configured to operate as a power source;
    a transmission connected to the motor;
    a battery configured to provide a driving voltage to the motor;
    a battery management system configured to manage a battery state of charge (SOC);
    a driving information detector configured to detect driving information of the electric vehicle;
    a brake controller configured to detect a total braking amount based on a signal output from the driving information detector and adjust hydraulic pressure supplied to a brake cylinder of a wheel based on a braking amount of hydraulic pressure; and
    a vehicle controller configured to determine whether regenerative braking of the electric vehicle is required based on the signal output from the driving information detector, calculate an available torque considering the battery system based on a signal output from the battery management system and an available torque considering the motor system based on a condition of the motor, and perform regenerative braking by calculating a regenerative braking capacity based on a minimum torque between the available torque considering the battery system and the available torque considering the motor system.

10. The system of claim 9, wherein the vehicle controller is configured to calculate the available torque considering the motor system based on a wheel torque and a derating factor predetermined at a motor power.

11. The system of claim 9, wherein the driving information detector includes:
   a vehicle speed sensor configured to detect a vehicle speed; and
   a brake pedal position sensor configured to detect a position value of a brake pedal.

12. The system of claim 9, wherein the vehicle controller is configured to calculate the available torque considering the battery system based on a charging possible power of the battery and charging efficiency of the battery.

13. The system of claim 12, wherein the vehicle controller is configured to calculate the charging possible power of the battery based on a charging limit power of the battery and a loss power of a part load.

14. The system of claim 12, wherein the vehicle controller is configured to calculate the charging efficiency of the battery based on a maximum charging torque of the motor according to a motor speed.

15. The system of claim 10, wherein the vehicle controller is configured to determine the derating factor at the motor power based on a condition of the motor system.

16. The system of claim 10, wherein the vehicle controller is configured to convert a motor torque to the wheel torque by reflecting a gear ratio of a transmission.

* * * * *